July 28, 1964
F. DILTS
3,142,273
HYDRO-JET SUBSOIL AERATOR
Filed May 21, 1963
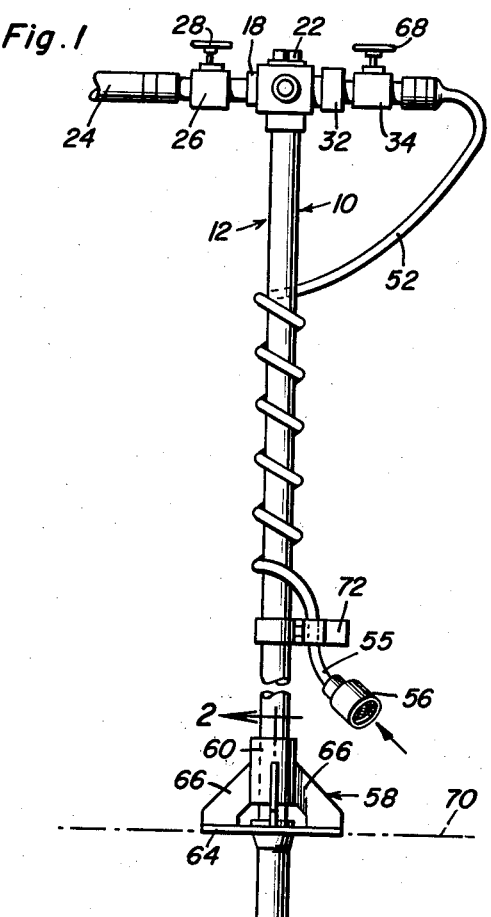
Fig. 1
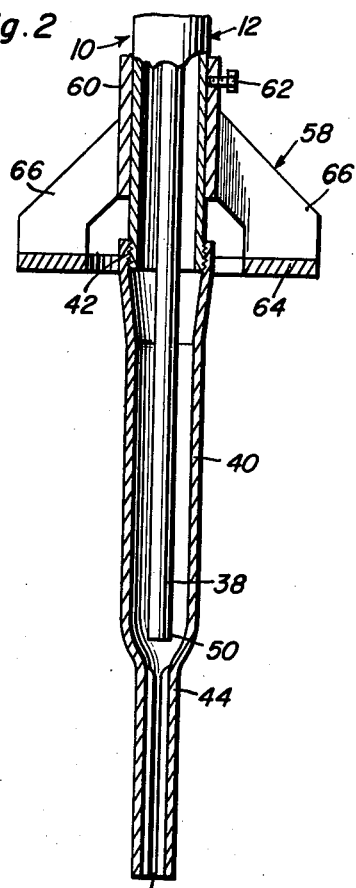
Fig. 2
Fig. 3
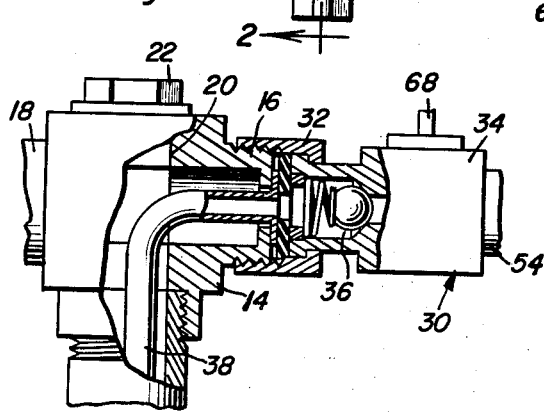
Fig. 4
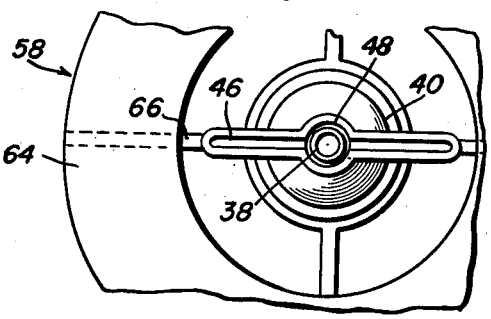
Fred Dilts
INVENTOR.
BY *Clarence A. O'Brien*
and *Harvey B. Jacobson*
Attorneys 3,142,273
HYDRO-JET SUBSOIL AERATOR
Fred Dilts, 2929 Cascade, Pueblo, Colo.
Filed May 21, 1963, Ser. No. 281,982
8 Claims. (Cl. 111—7.1)

This invention relates to a novel and useful subsoil aerator and more specifically to a water standpipe whose lower end is adapted to be forced into the ground and is provided with a flattened terminal end portion defining a cross-sectional area appreciably less than the cross-sectional area of the portion of the standpipe disposed thereabove. In this manner, the flow of water through the reduced cross-sectional area lower terminal end portion of the standpipe will cause the water to be discharged from the lower end of the standpipe at high velocity in order that the discharge of water from the standpipe may be utilized as a means for assisting in the insertion of the standpipe into the ground which is to be aerated.

The discharge of water from the lower terminal end portion of the standpipe at a high velocity is capable of functioning as a means to drill the ground immediately beneath the lower terminal end portion of the standpipe whereby the lower terminal end portion may more readily penetrate the ground down to the subsoil level thereof.

The subsoil aerator includes an inlet at the upper end of the standpipe and also a supplemental inlet including a small diameter inlet line disposed in the standpipe and opening outwardly of the latter at its upper inlet end. The lower end of the inlet line terminates in a portion of the reduced cross-sectional area of the lower terminal end of the standpipe whereby the flow of water downwardly through the standpipe will effect a partial vacuum in the inlet line thereby enabling the latter to be utilized to inject air and/or liquid chemicals into the flow of water passing downwardly through the standpipe. By this means, after the lower terminal end portion of the aerator has been forced down into the subsoil the aerator may be utilized to inject water as well as air and/or chemicals into the subsoil.

The main object of this invention is to provide a hydro-jet subsoil aerator constructed in a manner whereby the subsoil may be readily irrigated, aerated, and have various types of fertilizer added thereto.

A further object of this invention, in accordance with the immediately preceding object, is to provide a subsoil aerator constructed in a manner whereby the flow of irrigating water therethrough will effect a high rate of discharge of water from the lower terminal end portion of the aerator enabling the discharge from the aerator to be utilized in assisting the placement of the lower terminal end portion of the aerator into the subsoil by a hydro-jet drilling action.

Another object of this invention is to provide a subsoil aerator constructed in a manner whereby liquid fertilizer and/or air may be injected into the flow of irrigating fluid through the standpipe of the aerator without pressurizing the air and/or fluid fertilizer to a point above atmospheric pressure.

Still another object of this invention is to provide the standpipe of the aertor with a generally radially outwardly projecting abutment adapted for engagement with the surface of the ground into which the aerator is being inserted to limit pentration of the aerator into the subsoil.

A further object of this invention, in accordance with the immediately preceding object, is to provide a generally radially outwardly projecting abutment which may also be utilized as a foot step and also function as a means to transfer the weight of the user of the aerator to the standpipe of the aerator thereby forcing it more quickly into the subsoil which is to be aerated.

Still another object of this invention, in accordance with the immediately preceding object, is to provide a generally radially outwardly projecting abutment which may be adjusted vertically along the standpipe of the aerator in order that the penetration of the aerator into the subsoil may be limited as desired.

An ancillary object of this invention is to provide a supplemental inlet line of the aerator with a check valve for preventing a reverse flow of fluid through the inlet line while the flow of fluid from the aerator is being utilized to drill the hole in the ground for the aerator, during which time it is possible that a build-up in pressure could be realized in the supplemental inlet line.

A final object of this invention to be specifically enumerated herein is to provide a subsoil areator in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the subsoil aerator of the instant invention shown assembled and ready to be forced down into the subsoil which is to be aerated;

FIGURE 2 is an enlarged fragmentary vertical sectional view taken substantially upon the plane indicated by the section line 2—2 of FIGURE 1;

FIGURE 3 is an enlarged fragmentary bottom plan view of the aerator; and

FIGURE 4 is an enlarged fragmentary side elevational view of the upper portion of the standpipe with parts thereof being broken away and shown in section to illustrate the details of construction of the check valve.

Referring now more specifically to the drawings the numeral 10 generally designates the subsoil aerator of the instant invention which includes a standpipe generally referred to by the reference numeral 12.

The standpipe 12 has a cross fitting 14 threadedly secured to its upper end. The cross fitting 14 includes one inlet neck 16 and a second inlet neck 18 together with a third inlet 20 which is closed by means of a removable plug 22.

The inlet neck 18 has the discharge end 24 of a water supply conduit communicated therewith by means of a control valve assembly 26. The control valve assembly 26 includes an actuator 28 for opening and closing the control valve assembly 26 whenever it is desired to activate or deactivate the subsoil aerator 10.

A combined control valve and check valve assembly generally referred to by the reference numeral 30 is provided and is secured to the inlet neck 16 by means of a coupling member 32. The assembly 30 includes a control valve portion 34 and a check valve portion 36. It will be noted that the supplemental inlet means which includes the neck 16 also includes a small diameter inlet line 38 which is disposed in the standpipe 12. The inlet end of the inlet line 38 opens outwardly of the cross fitting 14 and into the check valve portion 36 of the assembly 30. It will be noted that the control valve portion 34 of the assembly 30 is disposed upstream of the check valve portion 36.

The lower end portion of the standpipe 12 includes a terminal end portion 40 which is removably secured to the standpipe 12 by means of a threaded connection 42. The lower end of the terminal end portion 40 is flattened as at 44 and defines an outlet opening 46 which is appreciably smaller in inside total cross-sectional area than the total inside cross-sectional area of the standpipe 12. In addition, from FIGURES 2 and 3 of the drawings it may be seen that the flattened portion 44 includes a central and widened zone 48 with which the outlet end of the inlet line 38 is axially aligned. The outlet end of the inlet line 38 terminates in the uppermost end portion of the reduced cross-sectional area portion of the terminal end portion 40 and is thereby disposed in a zone 50 which will inherently experience a pressure lower than atmospheric pressure when water is admitted into the upper end of the standpipe 12 through the control valve assembly 26. Thus, it may be seen that a partial vacuum will be formed in the outlet end of the inlet line 38 whenever a rapid flow of water is effected through the standpipe 12. An extension line 52 has its outlet end secured to the inlet neck 54 of the control valve 34 and its inlet end is coiled about the standpipe 12 and terminates in a free end portion 55 provided with a filter assembly 56 for filtering the fluid entering into the line 52.

An abutment assembly generally referred to by the reference numeral 58 is provided and includes a sleeve portion 60 which is slidably disposed on the standpipe 12 and includes a setscrew 62 which may be engaged with the outer surfaces of the standpipe 12 in order to retain the abutment assembly 58 in adjusted positions longitudinally of the standpipe 12.

The abutment assembly 58 includes an abutment annulus 64 which extends generally radially outwardly of the lower end of the standpipe 12 and is connected to the sleeve 60 by means of a plurality of upstanding braces or buttresses 66.

The control valve portion 34 is provided with an actuator 68 and it may therefore be seen that the subsoil aerator 10 may be utilized for the sole purpose of irrigating the subsoil and not aerating the latter. However, in most instances it is desirable to aerate the subsoil and in order to utilize the aerator 10 for this purpose the control valve assembly 26 may first be opened by means of the operator or actuator 28 whereupon a rapid flow of water through the standpipe 12 will be effected. Until such time as the discharge end of the terminal end portion 40 comes in contact with the ground 70, a partial vacuum will be formed in the inlet line 38 and if the control valve portion 34 of the assembly 30 is open, a flow of air will be effected through the inlet line 38. However, as soon as the outlet end of the terminal end portion 40 is brought into contact with the surface of the ground 70 a build-up of pressure will be effected in the inlet line 38. This pressure will of course enable the check valve portion 36 of the assembly 30 to close and thereby prevent the rearward flow of water through the inlet line 38.

As weight is applied to the abutment assembly 58 to force the terminal end portion 40 down into the ground, the high speed discharge of water from the discharge end of the terminal end portion 40 will act as a drill for washing away the soil immediately beneath the discharge end of the terminal end portion 40. In this manner, the flow of water through the standpipe 12 will assist in forcing the terminal end portion 40 down into the ground. After the terminal end portion has been forced into the ground the desired distance so that the abutment assembly 58 is engaged with the surface 70 of the ground, the jet drilling action of the water being discharged from the terminal end portion 40 will wash away a small amount of soil from beneath the discharge end of the terminal end portion 40. This will of course reduce the pressure at the discharge end of the terminal end portion 40 and again enable a partial vacuum to be effected in the inlet line 38. At this point, the check valve portion 36 will open and air will be drawn into the standpipe 12 by means of the inlet line 38. The air entering the standpipe 12 and being discharged from the outlet end of the inlet line 38 will of course commingle with the water passing outwardly of the standpipe 12 through the terminal end portion 40 and will therefore aerate the subsoil in which the lower end of the terminal end portion 40 is disposed. If it is desired to inject liquid fertilizer into the stream of water being injected into the subsoil, the filtered inlet end of the line 52 may be disposed in or communicated with a non-pressurized reservoir of suitable liquid fertilizer. In this instance, the control valve portion 34 of the assembly 30 may be utilized to properly adjust the amount of liquid fertilizer being introduced into the stream of water passing through the standpipe 12.

It will be noted from FIGURES 1 through 3 of the drawings that the flattened end portion 44, because of the widened zone 48 defines two areas of high speed fluid discharge on opposite sides of the zone 48 which is disposed in axial alignment with the outlet end of the inlet line 38. In this manner, while the cross-sectional area of the discharge end of the terminal end portion 40 has been held at a minimum in order to make it easier for the terminal end portion to be forced into the hardest of subsoils, the discharge end of the inlet line 38 has reduced pressure areas disposed on opposite sides thereof for effecting a maximum reduced pressure zone at the outlet end of the inlet line 38.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A subsoil aerator comprising a tubular standpipe including a water inlet at its upper end portion and a flattened blade-like terminal end portion on its lower end, the inside cross-sectional area of said terminal end portion being appreciably less than the inside cross-sectional area of the standpipe disposed above said terminal end portion whereby a reduced pressure area will be formed in said terminal end portion, said upper end portion also having supplemental inlet means including a small diameter inlet line disposed in said standpipe and opening outwardly of said standpipe at its upper inlet end and terminating at its lower outlet end in a portion of said reduced cross-sectional area terminal end portion whereby a flow of water downwardly through said standpipe will effect a partial vacuum in said inlet line enabling the latter to be utilized to inject air or liquid chemicals into said flow of water, said flattened cross-sectional terminal end portion including a central and widened zone with which said outlet end of said inlet line is axially aligned thereby defining two separate areas of reduced pressure on opposite sides of said wide zone.

2. The combination of claim 1 wherein said supplemental inlet means includes one way check valve means for preventing a reverse flow of fluid therethrough.

3. The combination of claim 2 wherein said supplemental inlet means also includes control valve means disposed upstream of said check valve means.

4. The combination of claim 3 wherein said supplemental inlet means further includes filter means disposed upstream of said check and control valve means for filtering the fluid flowing through said inlet means.

5. The combination of claim 1 including radially outwardly projecting abutment and step means carried by said standpipe above said terminal end portion adapted to be engaged by a foot of the user of said aerator when pushing said terminal end portion down into the soil and to comprise a limit for penetration of said terminal end portion into the soil.

6. The combination of claim 5 wherein said abutment includes means mounting said abutment on said standpipe for adjustment longitudinally of said standpipe.

7. The combination of claim 6 wherein said terminal end portion is removably secured to the lower end of said standpipe.

8. A subsoil aerator comprising a tubular standpipe including a water inlet at its upper end portion and a lower terminal end portion adapted to penetrate the ground, the inside cross-sectional area of said lower terminal end portion being appreciably less than the inside cross-sectional area of the standpipe disposed above said terminal end portion whereby a reduced pressure area will be formed in said terminal end portion, said upper end portion also having supplemental inlet means including a small diameter inlet line disposed in said standpipe and opening outwardly of said standpipe at its upper inlet end, said lower terminal end portion defining a widened central zone and a pair of reduced zones on opposite sides of said widened central zone communicating with the latter, the lower outlet end of said inlet line terminating in a portion of said reduced cross-sectional area terminal end portion and being axially aligned with said widened central zone thereby defining two separate areas of reduced pressure on opposite sides of said widened central zone with which the outlet end of said inlet line is axially aligned whereby a flow of water downwardly through said standpipe will effect a partial vacuum in said inlet line enabling the latter to be utilized to inject air or liquid chemicals into said flow of water.

References Cited in the file of this patent

UNITED STATES PATENTS

| | | |
|---|---|---|
| 1,895,335 | Maxen | Jan. 24, 1933 |
| 2,477,204 | Ravine | July 26, 1949 |
| 2,766,975 | Harrod | Oct. 16, 1956 |
| 2,902,953 | Young | Sept. 8, 1959 |
| 3,026,827 | Cunningham | Mar. 27, 1962 |
| 3,040,680 | McClushey | June 26, 1962 |